United States Patent [19]

Casberg

[11] Patent Number: 4,876,003
[45] Date of Patent: Oct. 24, 1989

[54] ENCASED POOL CHEMICAL TABLET WITH DOMED ENDS

[75] Inventor: John M. Casberg, Cheshire, Conn.

[73] Assignee: Olin Corporation, Cheshire, Conn.

[21] Appl. No.: 191,640

[22] Filed: May 9, 1988

[51] Int. Cl.⁴ ................................................ C02F 1/76
[52] U.S. Cl. .................................. 210/169; 210/198.1;
422/263; 422/264; 206/0.5
[58] Field of Search ....................... 210/169, 198.1;
422/263–266; 206/0.5

[56] References Cited

U.S. PATENT DOCUMENTS

| | | | |
|---|---|---|---|
| 1,931,765 | 10/1933 | Leever | 206/0.5 |
| 2,711,346 | 6/1955 | Irwin et al. | 299/24 |
| 2,826,484 | 3/1958 | Buehler | 206/0.5 |
| 2,976,129 | 3/1961 | Buehler | 206/0.5 |
| 2,997,160 | 8/1961 | Marshall, Jr. | 206/0.5 |
| 3,012,657 | 12/1961 | Roe | 206/0.5 |
| 3,047,370 | 7/1962 | Autges et al. | 206/0.5 |
| 3,199,665 | 8/1965 | Eriksson | 206/0.5 |
| 3,483,989 | 12/1969 | Gopstein | 210/242 |
| 3,607,103 | 9/1971 | Kiefer | 206/0.5 |
| 3,620,759 | 11/1971 | Maddox | 206/0.5 |
| 3,823,816 | 7/1974 | Controulis et al. | 206/0.5 |
| 3,856,932 | 12/1974 | May | 424/16 |
| 4,040,515 | 8/1977 | Hessel et al. | 206/0.5 |
| 4,333,752 | 6/1982 | Thies et al. | 206/0.5 |
| 4,350,666 | 9/1982 | Klutts | 422/263 |
| 4,374,563 | 2/1983 | Alexander | 206/499 |
| 4,435,858 | 3/1984 | Dolan | 4/228 |
| 4,530,120 | 7/1985 | Etani | 4/228 |
| 4,546,503 | 10/1985 | Casberg | 4/496 |
| 4,643,881 | 2/1987 | Alexander et al. | 4/228 |

FOREIGN PATENT DOCUMENTS

439506 12/1935 United Kingdom ................ 422/266

Primary Examiner—Peter Hruskoci
Assistant Examiner—Coreen Y. Lee
Attorney, Agent, or Firm—Ralph D'Alessandro

[57] ABSTRACT

A chlorine compound containing chemical tablet for dissolution into a surrounding body of water which includes an elongate tablet with length longer than thickness having an elongate central section connecting two opposing obliquely tapered ends along a longitudinal axis and an elongate tablet shell encasing the tablet having a corresponding elongate central section connecting two opposing obliquely tapered ends. The ends of the shell have openings therein and form an inwardly sloping and obliquely angled junction with the shell's elongate central section. The encased tablet lies in a skimmer unit on its side along a longitudinal axis and dissolves in a generally uniform and slow rate.

19 Claims, 2 Drawing Sheets

FIG-6 ental view of the domed tablet having the top quarter of the tablet
ENCASED POOL CHEMICAL TABLET WITH DOMED ENDS

BACKGROUND OF THE INVENTION

This invention relates generally to a package for dispensing a water sanitizing chemical. More specifically, it relates to a halogen containing compound that is encased in a tightly fitting material which has openings on opposing ends to permit dissolution of the halogen compound containing chemical.

A persistent problem in treating bodies of water with sanitizing chemicals has been the ability to provide a dispensing package that permits uniform distribution of an available halogen, such as chlorine, into the surrounding body of water over a predetermined period of time in a simple and reliable manner. Attempts to simply obtain this uniform distribution from dispensing packages for water sanitizing chemicals have led to the use of pressed tablets in forms varying from sticks to elliptical briquettes to circular or generally cylindrical blocks. Means have been devised to meter the sanitizing chemical whatever its form into the surrounding water.

Some of these metering means have included the use of a porous matrix of material to secure the chemical tablets and enclosing the porous matrix material and chemical tablets with a water impermeable synthetic material on the top and sides. Water permeates the porous underside of the matrix by osmosis and gradually dissolves the available sanitizing chemical into the surrounding water. However, an approach such as this has little control over the dissolving rate of the packaged chemicals.

Another approach uses a tablet of available chlorine containing compound that has two substantially parallel faces secured to a generally perpendicular cylindrical exterior surface that is covered with an impervious film secured to the tablet by means of a suitable adhesive. One of the parallel plane faces could also be covered by this same impervious material. This simple dispensing package is effective, but tends to be relatively costly because of the adhesive and results in an overly fast dissolving rate of the sanitizing chemical when calcium hypochlorite is employed.

Shrink wrap material, either water shrinkable or heat shrinkable, has been employed in an attempt to provide a simpler, less costly means of adhering a covering to the water sanitizing chemical. One approach uses heat shrinkable material to encase a plurality of tablets which could be cut to the desired length and placed in a strainer basket of a swimming pool skimmer unit. This provides a generally uniform dissolving rate but, apparently because of the flat ends, results in a relatively rapid dissolution of the encased sanitizing chemical.

The need for a simply packaged water sanitizing chemical that releases available chlorine at a relatively uniform rate over a long predetermined period is solved by the present invention which uses an encased tablet with obliquely tapered ends and openings in the tapered ends of the casing or shell to permit controlled release of the dissolved chemical to the surrounding water.

SUMMARY OF THE INVENTION

It is an object of the present invention to provide a package for a water sanitizing chemical that permits the chemical to dissolve uniformly and over a substantially longer period of time than prior packaging designs.

It is another object of the present invention to provide packaging for a water sanitizing chemical that permits the chemical to be simply handled and dispensed by consumers.

It is a feature of the present invention that an elongate halogen compound containing tablet with an elongate central section connecting two opposing obliquely and inwardly tapered ends is encased by a tablet shell of the same configuration, but having openings in the ends to permit the chemical to dissolve therethrough into the surrounding body of water.

It is another feature of the present invention that the inwardly sloping tapered ends guide downwardly directed water flow in a pool skimmer unit away from the top of the opening in the ends and slows down the dissolution rate.

It is still another feature of the present invention that the sanitizing chemical in the tablet dissolves out of the bottom of the encasing shell in an arched pattern so that more chemical dissolves from the bottom than dissolves from the top of the shell.

It is an advantage of the present invention that the inwardly tapered ends of the encasing shell slow the dissolving time of the encased sanitizing chemical up to 30 percent when used in a forced water circulation system in a pool skimmer unit.

It is another advantage of the present invention that the domed or inwardly tapered shell ends prevent the tablets from standing on end in a skimmer unit.

These and other objects, features and advantages are obtained in the elongate tablet of halogen compound containing chemical having a length longer than its thickness with an elongate central section connecting two opposing obliquely and inwardly tapered ends encased in an elongate tablet shell having a corresponding elongate central section connecting two opposing obliquely and inwardly tapered ends which have openings therein. The encased halogen compound containing chemical tablet is especially intended for use within a skimmer unit in a forced water circulation system, such as is used with swimming pools.

BRIEF DESCRIPTION OF THE DRAWINGS

The advantages of this invention will become apparent upon consideration of the following disclosure of the invention, especially when it is taken in conjunction with the accompany drawings wherein.

DETAILED DESCRIPTION OF THE PREFERRED EMBODIMENT

Figure 1:
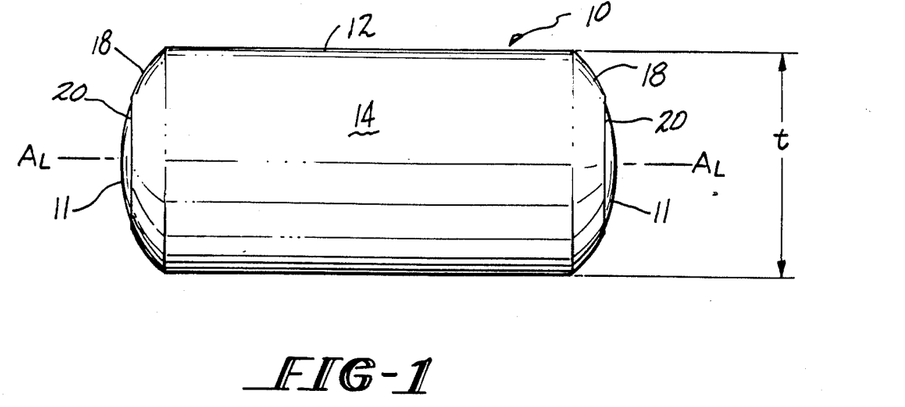
FIG. 1 is a side elevational view of a domed tablet showing the encasing shell with the obliquely and inwardly tapered ends and the tablet extending out of the openings in the ends of the shell.

FIG. 1 shows the encased tablet, indicated generally by the numeral 10 in a side elevational view. The tablet 11 is seen extending from the shell 12 at the two opposing ends through the openings 20 in the shell 12. The shell 12 has opposing and obliquely angled end portions 18 that are sloped generally inwardly and, with reference to the top of the shell, downwardly. These ends 18 form an inwardly sloping and obliquely angled junction with the shell's elongate central section, which is indicated by the numeral 14.

Figure 2:
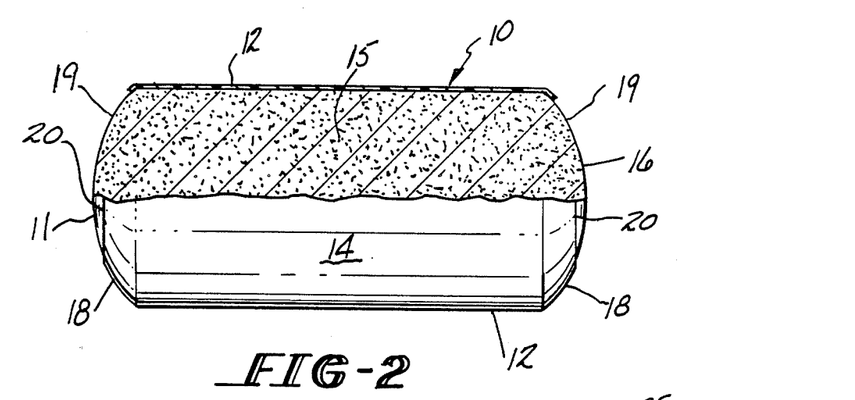
FIG. 2 is a partial sectioned side elevational view of the domed tablet having the top quarter of the tablet sectioned and the top quarter of the shell cut away with the inwardly sloping shell ends removed.

FIG. 2 shows the upper quarter of the shell 12 cut away in the revealing the underlying tablet 11 that is formed from compressed granular material. The tablet 11 has an elongate central section 15 and opposing obliquely angled ends 19 which are visible by the breaking away in FIG. 2 of the angled end portions 18 of the shell 12. As seen in FIGS. 1 and 2, the encased tablet 10 has a generally cylindrically shaped central section with the inwardly and obliquely sloping ends 19.

Figure 6:
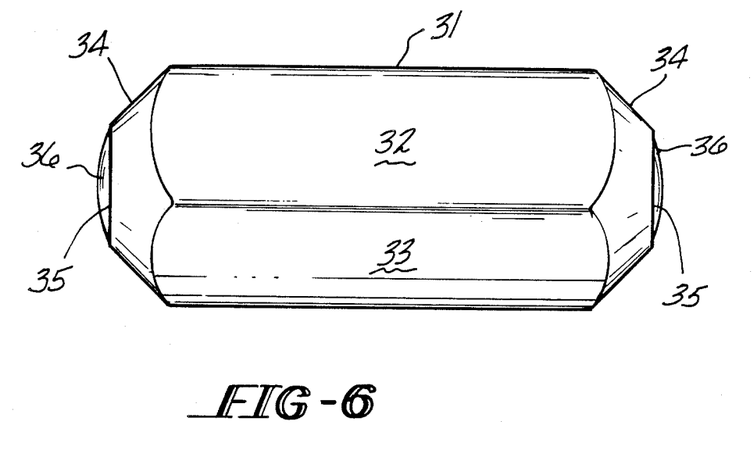
FIG. 6 is a side elevational view of an alternative embodiment of the encased tablet rotated 90° having a quadrilateral configuration in the elongate central section.

However, as seen in FIG. 6 an alternative polygonal configuration could be employed. In this particular FIGURE a tablet shell 31 with a rectangular central elongate section is featured having top portion 32, a side portion 33 and opposing inwardly and obliquely angled ends 34. The tablet shell 31 has openings 35 in opposing ends to permit the pool chemical tablet 36 to extend therethrough and to permit dissolution of the pool chemical into the surrounding water to take place. It should be noted that although a rectangular design is shown in FIG. 6, any polygonal configuration could be employed, such as pentagonal, hexagonal, heptagonal or octagonal, etc. For simplicity in molding or pressing the tablets in mechanical presses, it is felt that an even number of sides would be preferred in the polygon structure.

Any type of a shrink wrap plastic material may be employed for use in the encasing shell. It has been found that heat shrinkable, wrap such as clear, semi-rigid polyvinyl chloride has been a reliable material. A satisfactory thickness for the shrink wrap material has been about 6 mils supplied with a 75 millimeter flat dimension and a length of 11 millimeters with a minimum shrink of about 55 percent. Acceptable ranges for the shrink wrap material have been a thickness of about 5.8 to about 6.2 mils, a flat dimension of about 74 to about 76 millimeters and a length of about 108 to about 112 millimeters. The minimum shrinkage has been from about 55 to about 60 percent. A preferred size for the openings 20 in the shrink wrap material used to form the shell is about 1.0 inch diameter, with an acceptable range of about 0.09 to about 1.1 inches in diameter. Although other configurations, such as square, rectangular, pentagonal, or oval could be employed, a circular opening shape is preferred.

The sanitizing chemical or halogen compound containing tablet, in this instance chlorine, has been formed as previously mentioned with a cylindrical elongate central section with domed ends. The optimum weight has been about 298 grams with a preferred control section diameter of about 1.81 inches and a preferred length of about 3.98 inches. The weight can range from about 298 to about 308 grams and the length can vary from about 3.90 to about 4.04 inches. The optimum density of the tablet can be from about 1.90 to about 1.95 grams per cubic centimeter with a hardness of about 350 pounds.

A typical chemical composition of the chlorine compound containing chemical has been about 98.5 percent commercial grade calcium hypochlorite with about 1.5 percent powdered lime added. Percentages can range from about 98.3 to about 98.6 percent calcium hypochlorite and about 1.4 to about 1.7 percent powdered lime added.

Figure 3:
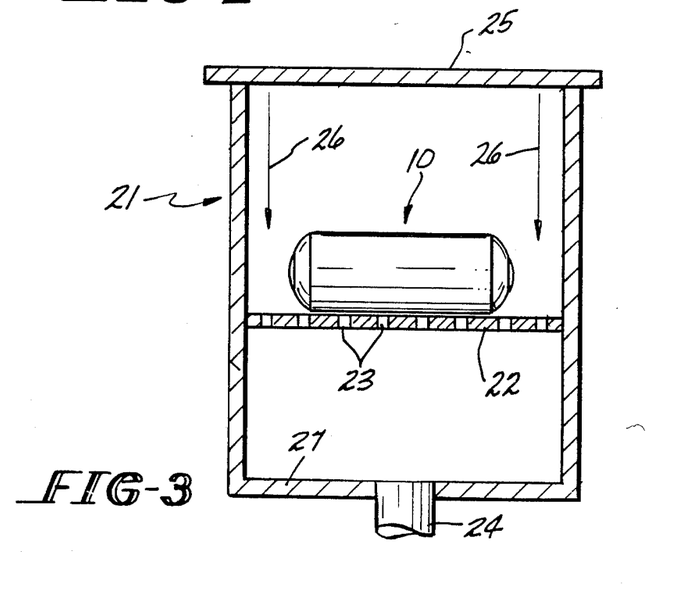
FIG. 3 is a side elevational view of the domed tablet placed on its side in a skimmer unit that is connected to a pool via a recirculation flow loop with forced water circulation.

FIG. 3 shows a skimmer unit, indicated generally by the numeral 21, that is connected in a forced water circulation system as part of a recirculation loop to a swimming pool. The top 25 is removable to permit the encased tablet 10 to be placed on the support shelf 22. Forced water circulates through the flow loop and enters the skimmer unit 21 so that it flows in a generally vertically downwardly direction indicated by the numeral 26. Water passes through the holes 23 in the support shelf 22 and continues flowing toward the bottom 27 where it exits through the skimmer outlet pipe 24 enroute to the pool.

Figure 4:
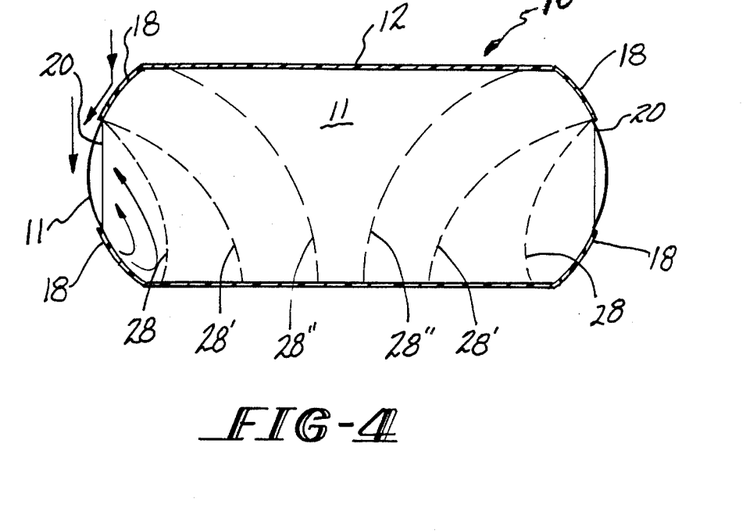
FIG. 4 is a sectioned side elevational view showing in dotted lines the progressive dissolution within the shell of the chlorine compound containing chemical tablet when the tablet is placed in a skimmer unit with forced circulation.

FIG. 4 shows the dissolving pattern of the tablet 11 that occurs within the shell 12 through the end openings 20. Also shown are the directional arrows indicating how the generally vertically downwardly flowing water is deflected by the obliquely and inwardly angled shell ends 18 to cause the water to flow down over the tops of the openings 20. Once the initial portion of the tablet 11 extending out through the openings 20 is dissolved, the dissolution of the tablet 11 takes place in a manner that implies that water enters through the lower half of the openings 20 since the lines of progressive dissolution 28, 28' and 28" illustrate how more of the sanitizing chemical is dissolved away at the bottom of the shell on the side adjacent the skimmer shelf than on the opposing top side. It is theorized that the inwardly and obliquely angled ends 18 create a flow into the shell that act as a controlled scoop to bring a controlled amount of water through a controlled flow rate into contact with the chemical and develops a swirling pattern that dissolves away the chemical as indicated in FIG. 4.

The size of the openings 20 in the shell 12 encasing the tablet 11 help determine the dissolving rate of the sanitizing chemical, in addition to the size, shape, and solubility of the tablet. The encased tablet 10 has been designed to last about one week's time in a 10,000 gallon pool with eight (08) hours per day of forced water circulation when placed in a typical commercial in ground pool skimmer unit, such as a Haywood Model SP 1082 or Model SP 1084. A 20,000 gallon pool requires two encased tablets 10 and a 30,000 gallon pool requires three encased tablets 10 for the desired one week time period.

The encased tablet 10, because of being exposed only through the openings 20 on the opposing ends, dissolves more slowly when the circulating pump in the forced circulation system is off. This is significant since the preferred sanitizing chemical is granular calcium hypochlorite, which is a relatively fast dissolving chemical that, prior to the present invention, even in tablet form would dissolve too quickly, lasting only about a day.

In order to exemplify the results achieved, the following Example is provided without any intent to limit the scope of the instant invention to the discussion therein. The Example is intended to compare the dissolving rate of tablets with the same weight of calcium hypochlorite under the same conditions of pool size, water temperature, water circulation rate and water circulation time in a pool skimmer unit. Only the size of the openings 20 in the tablet shells and the shape of the opposing ends of the tablets and the tablet shells were changed to show the effect on the dissolving rates. The tablets with two opposing flat ends were selected for comparison because of the teachings of the closest known prior art. Horizontal and vertical positionings of the tablets were compared. The superiority of the instant invention over the teachings of the closest known prior art is shown in the following Example. The degree of superiority is an unexpected and surprising result, providing about a 30 percent increase in the dissolving time of the tablet while maintaining the desired available chlorine level in the pool water.

EXAMPLE

Granular calcium hypochlorite was pressed at 20 tons pressure in a die and press to form tablets of about 298 grams weight. The tablets with flat ends, four of the six tested with the results graphically illustrated in FIG. 5, were formed from two flat ended tablets of about 149 grams each joined together and shrink wrapped together in a package. The shrink wrapping was polyvinyl chloride tubing that was shrink wrapped to give the size openings indicated. All openings were circular with the FIG. 5 "D" symbol representing diameter.

The tablets were placed individually in inground pool-sized Hayward Model SP 1084 skimmer units connected to 110 gallon tanks. The water temperature was initially about 75° F. and was stabilized after a short period of time at about 73° F. The water was circulated 24 hours a day at a rate of about 10 gallons per minute through the skimmer unit. The domed tablets were about 3.93 inches in length along the longitudinal axis $A_L$ of FIG. 1, and about 1.81 inches in diameter or thickness across the elongate central section, being generally cylindrically shaped. The flat ended tablets were about 3.69 inches in length with the same diameter or thickness in the elongate central section. The ends of the domed tablets were about 0.38 of an inch from the junction of the elongate central section and the obliquely and inwardly sloped ends. The encasing shell for the domed tablets had a length of about 3.81 inches along the longitudinal axis, $A_L$, seen in FIG. 1. The amount of calcium hypochlorite dissolved was determined from the increased available chlorine measured in water.

The commercial grade granular calcium hypochlorite used to form the tablets was all selected from the same production lot and had an analysis as follows and as compared with the accompanying typical analysis range:

TABLE I

| Component | Analysis Percent by weight | Typical Analysis Range |
|---|---|---|
| Calcium Hypochlorite | 71.40 | 69.12–73.25 |
| Calcium Chloride | 1.03 | 0.01–1.18 |
| Calcium Chlorate | 1.16 | 0.70–1.68 |
| Calcium Carbonate | 1.87 | 1.10–2.48 |
| Calcium Hydroxide | 2.53 | 2.16–3.10 |
| Sodium Chloride | 13.09 | 13.09–16.54 |
| Water | 9.80 | 6.90–9.80 |

The following data in TABLE II shows the performance of three differently configured tablets that were placed in skimmer units in first a generally horizontal orientation and then secondly in a generally vertical configuration. All of the sanitizing chemical was deemed exhausted when the recorded weight was about 10.50 ounces, except in one instance where 10.41 ounces was deemed to be the limit.

Figure 5:
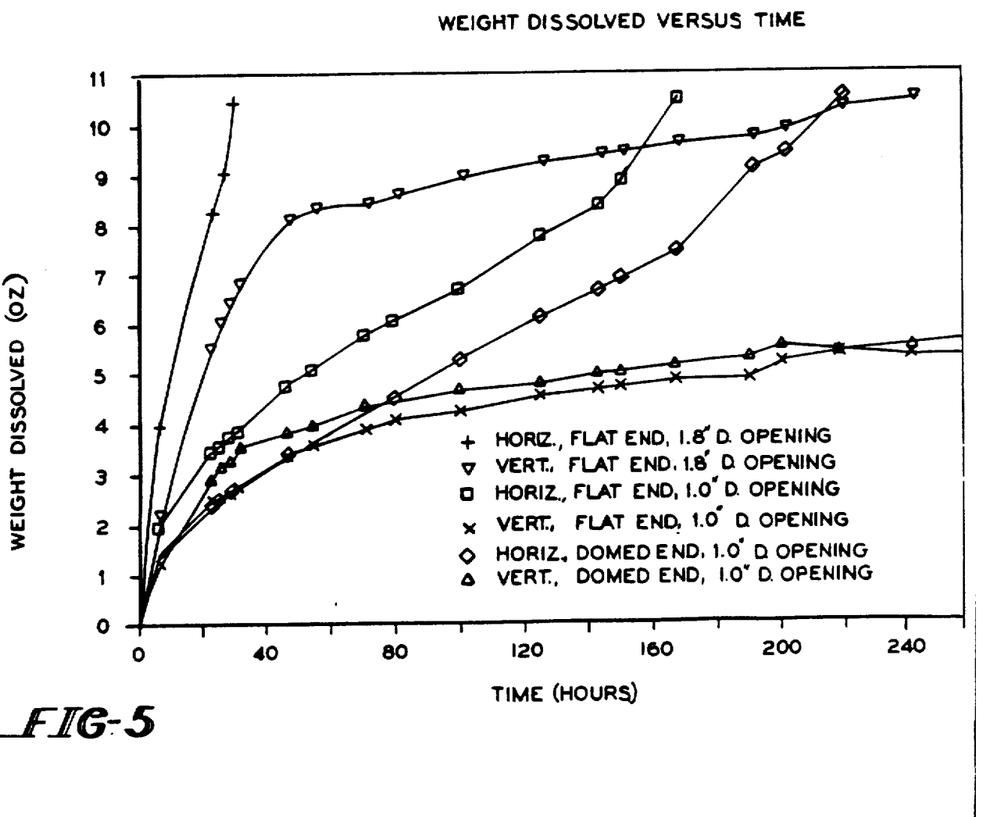
FIG. 5 is a graphical depiction of the dissolving rates of encased tablets of various configurations reflecting the weight of calcium hypochlorite dissolved over a period of time in a skimmer unit with forced circulation.

Tablets 1 and 4, represented in FIG. 5 by the + and ∇ graphical plotting symbols, had no encasing shell material over their opposing ends, attempting to simulate the teachings of U.S. Pat. No. 3,856,932. The elongate central section in Tablets 1 and 4 had a diameter of about 1.81 inches. Tablets 2 and 4, represented in FIG. 5 by the ☐ and X graphical plotting symbols, had flat opposing ends with about 1 inch diameter openings in their opposing ends attempting to simulate the combined teachings of U.S. Pat. Nos. 3,856,932 and 4,374,563. Tablets 3 and 6, represented in FIG. 5 by the Δ and ◇ graphical plotting symbols, illustrate the performance characteristics of the instant invention Domed tablet 6 was supported in the vertical position by a holder or stand in the center of the skimmer support shelf. The same support was used with flat ended tablets 4 and 5 to ensure central positioning on the shelf.

TABLE II

| | Weight of Tablet Dissolved (oz.) | | | | | |
|---|---|---|---|---|---|---|
| | Horizontally Positioned | | | Vertically Positioned | | |
| | Flat End | | Domed End | Flat End | | Domed End |
| | Openings-Diameter | | | Openings-Diameter | | |
| Time (hours) | 1.8" TABLET 1 | 1.0" TABLET 2 | 1.0" TABLET 3 | 1.8" TABLET 4 | 1.0" TABLET 5 | 1.0" TABLET 6 |
| 0 | 0 | 0 | 0 | 0 | 0 | 0 |
| 1 | 0.58 | 0.32 | 0.12 | 0.21 | 0.19 | 0.13 |
| 3 | 1.46 | 0.80 | 0.44 | 0.55 | 0.48 | 0.39 |
| 7 | 3.99 | 2.01 | 1.30 | 2.20 | 1.43 | 1.23 |
| 3 | 8.30 | 3.50 | 2.40 | 5.49 | 2.52 | 2.93 |
| 26 | 9.10 | 3.60 | 2.50 | 6.02 | 2.60 | 3.19 |
| 29 | 10.50 | 3.80 | 2.70 | 6.41 | 2.62 | 3.27 |
| 32 | | 3.90 | 2.77 | 6.81 | 2.73 | 3.56 |
| 47 | | 4.80 | 3.40 | 8.09 | 3.36 | 3.82 |
| 55 | | 5.10 | 3.60 | 8.34 | 3.57 | 3.97 |
| 71 | | 5.80 | 4.20 | 8.41 | 3.89 | 4.35 |
| 80 | | 6.10 | 4.50 | 8.60 | 4.07 | 4.40 |
| 100 | | 7.73 | 5.25 | 8.97 | 4.23 | 4.67 |
| 125 | | 7.80 | 6.11 | 9.24 | 4.53 | 4.78 |
| 143 | | 8.41 | 6.64 | 9.38 | 4.66 | 4.97 |

TABLE II-continued

| | Weight of Tablet Dissolved (oz.) | | | | | |
|---|---|---|---|---|---|---|
| | Horizontally Positioned | | | Vertically Positioned | | |
| | Flat End | | Domed End | Flat End | | Domed End |
| | Openings-Diameter | | | Openings-Diameter | | |
| Time (hours) | 1.8" TABLET 1 | 1.0" TABLET 2 | 1.0" TABLET 3 | 1.8" TABLET 4 | 1.0" TABLET 5 | 1.0" TABLET 6 |
| 150 | | 8.90 | 6.90 | 9.41 | 4.71 | 4.97 |
| 167 | | 10.50 | 7.44 | 9.60 | 4.85 | 5.15 |
| 190 | | | 9.10 | 9.70 | 4.87 | 5.30 |
| 200 | | | 9.40 | 9.84 | 5.19 | 5.52 |
| 218 | | | 10.50 | 10.28 | 5.34 | 5.50 |
| 242 | | | | 10.41 | 5.37 | 5.50 |
| 363 | | | | | 6.20 | 6.31 |

As can be seen, the horizontally positioned Tablet 3 lasted about 51 hours longer than a similarly positioned Tablet 2 with flat ends and identically sized end openings. This is about a 30.6 percent increase in dissolving time, an unexpected and surprising result in view of the varying of only the end shape of the tablets.

The generally vertically oriented tablets dissolved slower than their generally horizontally positioned counterparts because of the inability of the sanitizing chemical to exit out of both ends. In the case of Tablets 1 and 4, the dissolving rate was very rapid, especially in the first 24 hours. In both instances the bulk of the chemical was dissolved in the initial 24 hour period. In the case of Tablets 5 and 6 the generally vertically oriented tablets never completely dissolved during the testing period. Hence, the most desirable dissolving rate was obtained with the generally horizontally positioned tablets. The longest and most uniform dissolving rate was obtained with the domed tablet 3 that was generally horizontally positioned.

The domed ends of the tablet 11 and the shell 12 also prevent the encased tablet 10 from standing vertically on one of its ends during use in a pool skimmer unit. It has been determined that the obliquely angled junction formed by the obliquely tapered ends and the shell's elongate central section can have an angle that varies from about 10 degrees to about 80 degrees from the horizontal. A preferred range is from about 40 to about 70 degrees.

The ratio of the length of the encased tablet to its diameter or thickness, indicated as t in FIG. 1, is also a factor that can affect the dissolving rate Generally the smaller the ratio, the more rapidly the sanitizing chemical dissolves. A ratio that has proven desirable is one from about 2.0 to about 2.2 in combination with end openings 20 of about one inch diameter.

While the preferred structure in which the principles of the present invention have been incorporated is shown and described above it is to be understood that the invention is not t be limited to the particular details thus presented, but in fact, widely different means may be employed in the practice of the broader aspects of this invention. For example the chlorine containing compound used in the chemical tablet could be trichloroisocyanuric acid, sodium dichlorocyanurate or lithium hypochlorite, in addition to the previously discussed calcium hypochlorite. The sanitizing chemical could equally well be any suitable halogen containing compound that is capable of being formed into a tablet and encased as described, such as bromine which is available commercially as bromine tablets. A commercially available tablet is based on 1-bromo-3-chloro-5,5-dimethylhydantoin. The scope of the appended claims is intended to encompass all obvious changes in the details, materials and arrangement of parts which will occur to one of skill in the art upon a reading of the disclosure.

What is claimed is:

1. A halogen compound containing chemical tablet for dissolution in a surrounding body of water comprising in combination:
   (a) an elongate halogen containing tablet of a length longer than its thickness, the tablet having an elongate central section connecting two opposing obliquely tapered ends along a longitudinal axis; and
   (b) an elongate tablet shell encasing the tablet having an elongate central section connecting two opposing obliquely tapered ends, the ends each having an opening therein centered on the longitudinal axis of the tablet and forming an inwardly sloping and an obliquely angled junction with the shell's elongate central section, the tablet shell fitting securely about the tablet.

2. The tablet according to claim 1 wherein the elongate central section of the shell is generally cylindrical.

3. The tablet according to claim 1 wherein the obliquely angled junction of the tapered ends with the elongate central section is from about 10 to about 80 degrees.

4. The tablet according to claim 1 wherein each of the opposing openings has distance thereacross which is about one quarter the length of the tablet measured along the longitudinal axis.

5. The tablet according to claim 1 wherein the length of the tablet along the longitudinal axis is about two times the thickness.

6. The tablet according to claim 1 wherein the elongate central section of the tablet and the shell is generally cylindrical.

7. The tablet according to claim 6 wherein the tablet extends through the openings in the two opposing obliquely tapered ends.

8. The tablet according to claim 1 wherein the halogen compound containing tablet is calcium hypochlorite.

9. The tablet according to claim 7 wherein the tablet is placed within a swimming pool skimmer connected in a flow loop to a swimming pool, the skimmer having a generally downwardly directed flow of water onto the tablet so that the tablet is dissolved away from the openings.

10. The tablet according to claim 9 wherein the tablet within the tablet shell rests generally horizontally on a support within the skimmer on a side generally parallel to the longitudinal axis.

11. The tablet according to claim 10 wherein the tablet dissolves away within the shell through the openings so that there is less chemical tablet adjacent the side on which the tablet shell rests than on a side opposite the side on which the tablet shell rests.

12. The tablet according to claim 1 wherein the elongate central section of the tablet and the shell is polygonal.

13. A halogen compound containing chemical tablet dissolving system for dissolving halogen into a surrounding body of water that is connected via a recirculation flow loop with forced circulation of combination:
   (a) a skimmer connected to the recirculation flow loop having a support shelf intermediate a top and a bottom, the forced circulation of water directing water generally vertically downwardly to the support shelf;
   (b) a halogen compound containing chemical tablet of a length longer than its thickness having an elongate central section connecting two opposing obliquely tapered ends along a longitudinal axis, the tablet resting along the central section on the support shelf; and
   (c) an elongate tablet shell encasing the tablet having an elongate central section connecting two opposing obliquely tapered ends corresponding to the elongate central section and the two opposing obliquely tapered ends of the tablet, each ends of the shell having an opening therein centered on the longitudinal axis of the tablet and forming a downwardly sloping and obliquely angled junction with the elongate central section of the shell.

14. The system according to claim 13 wherein the length of the tablet along the longitudinal axis is about two times the thickness of the tablet.

15. The system according to claim 14 wherein each of the opposing openings in the shell has a distance thereacross which is about one quarter the length of the tablet measured along the longitudinal axis.

16. The system according to claim 15 wherein the elongate central section of the tablet and the shell is polygonal.

17. The system according to claim 15 wherein the elongate central section of the tablet and the shell is generally cylindrical.

18. The system according to claim 13 wherein the tablet is dissolved away from the openings in the shell by the generally downwardly directed water in a pattern so that there is less chemical tablet in the shell adjacent the shelf than on the side of the shell opposite the shelf.

19. The system according to claim 18 wherein the halogen containing compound is calcium hypochlorite.

* * * * *

UNITED STATES PATENT AND TRADEMARK OFFICE
CERTIFICATE OF CORRECTION

PATENT NO. : 4,876,003
DATED : October 24, 1989
INVENTOR(S) : John M. Casberg
David E. Michaels It is certified that error appears in the above—identified patent and that said Letters Patent is hereby corrected as shown below:

On the front page of the patent, after "[75] Inventor: John M. Casberg, Cheshire, Conn." insert --David E. Michaels, Southington, Conn.--

Signed and Sealed this

Twenty-fifth Day of December, 1990

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,876,003                                    Page 1 of 2

DATED : October 24, 1989

INVENTOR(S) : John M. Casberg and David E. Michaels

It is certified that error appears in the above—identified patent and that said Letters Patent is hereby corrected as shown below:

Column 2, line 48, after "the", delete "accompany" and insert --accompanying--.

Column 3, line 43, after "the", delete "polygon" and insert --polygonal--.

Column 6, Table II, in the first column headed "Time (hours)", between the numerals "7" and "26", delete "3", and insert --23--.

Column 7, line 54, after "not", delete "t", and insert --to--.

Column 9, Claim 13, line 12, after "of", insert --water to a large reservoir of water comprising in--.

Please add omitted FIGURE 5 as per the attached sheet .

Signed and Sealed this

Eleventh Day of February, 1992

Attest:

HARRY F. MANBECK, JR.

Attesting Officer       Commissioner of Patents and Trademarks

UNITED STATES PATENT AND TRADEMARK OFFICE
CERTIFICATE OF CORRECTION

PATENT NO. : 4,876,003

DATED : October 24, 1989

INVENTOR(S) : John M. Casberg and David L. Michaels

It is certified that error appears in the above—identified patent and that said Letters Patent is hereby corrected as shown below: Please add FIGURE 5 as follows:

FIG-5